United States Patent
Hagl

(10) Patent No.: US 9,010,799 B2
(45) Date of Patent: Apr. 21, 2015

(54) MOLDING IN AIRBAG DOOR FEATURES IN A VEHICLE INTERIOR PANEL USING A MOVABLE MOLD MEMBER

(75) Inventor: Reinhold Hagl, Simpsonville, SC (US)

(73) Assignee: Faurecia Interior Systems, Inc., Auburn Hills, MI (US)

(*) Notice: Subject to any disclaimer, the term of this patent is extended or adjusted under 35 U.S.C. 154(b) by 118 days.

(21) Appl. No.: 13/425,909

(22) Filed: Mar. 21, 2012

(65) Prior Publication Data

US 2013/0249195 A1   Sep. 26, 2013

(51) Int. Cl.
| | | |
|---|---|---|
| *B60R 21/20* | (2011.01) | |
| *B29C 37/00* | (2006.01) | |
| *B29C 45/00* | (2006.01) | |
| *B29C 45/14* | (2006.01) | |
| *B60R 21/205* | (2011.01) | |
| *B60R 21/215* | (2011.01) | |
| *B60R 21/2165* | (2011.01) | |
| *B29L 31/30* | (2006.01) | |

(52) U.S. Cl.
CPC ......... *B29C 37/0057* (2013.01); *B29C 45/0081* (2013.01); *B29C 45/14073* (2013.01); *B29C 45/14786* (2013.01); *B29L 2031/3038* (2013.01); *B29L 2031/3041* (2013.01); *B60R 21/205* (2013.01); *B60R 21/215* (2013.01); *B60R 21/2165* (2013.01)

(58) Field of Classification Search
CPC .... B60R 21/21; B60R 21/215; B60R 21/2165
USPC ............................................ 280/728.3, 728.2
See application file for complete search history.

(56) References Cited

U.S. PATENT DOCUMENTS

| | | | | |
|---|---|---|---|---|
| 5,458,361 A | * | 10/1995 | Gajewski | 280/728.3 |
| 5,865,461 A | * | 2/1999 | Totani et al. | 280/728.3 |
| 6,733,713 B2 | * | 5/2004 | Takahashi | 264/328.7 |
| 6,753,057 B1 | * | 6/2004 | Gardner, Jr. | 428/43 |
| 7,101,505 B2 | * | 9/2006 | Winget et al. | 264/513 |
| 8,011,688 B2 | * | 9/2011 | Komura et al. | 280/728.3 |
| 2004/0126532 A1 | * | 7/2004 | Gardner, Jr. | 428/43 |
| 2005/0127641 A1 | * | 6/2005 | Cowelchuk et al. | 280/728.3 |
| 2006/0082106 A1 | * | 4/2006 | Hier et al. | 280/728.3 |
| 2007/0040360 A1 | * | 2/2007 | Riha et al. | 280/728.3 |
| 2011/0148079 A1 | * | 6/2011 | Dargavell et al. | 280/728.3 |
| 2011/0316262 A1 | * | 12/2011 | Mazzocchi et al. | 280/728.3 |
| 2012/0038133 A1 | * | 2/2012 | Kalisz | 280/728.3 |
| 2012/0223512 A1 | * | 9/2012 | Barr et al. | 280/728.3 |

* cited by examiner

*Primary Examiner* — Toan To
(74) *Attorney, Agent, or Firm* — Reising Ethington P.C.

(57) ABSTRACT

A method of making a vehicle interior panel substrate with a reduced thickness portion along a boundary of an airbag door includes molding the substrate using a substrate mold that includes a movable mold member. The movable mold member is part of a mold section and moves with respect to other portions of the mold section during the molding process to form the reduced thickness portion, which may include a hinge or a tear seam. The mold member moves after plastic material is introduced into the mold cavity. The plastic material is allowed to expand when substrate mold sections are moved away from each other. Plastic material expansion may be part of a structural gas injection (SGI) process. A scrim material or other hinge reinforcement may be molded into the substrate.

16 Claims, 2 Drawing Sheets

MOLDING IN AIRBAG DOOR FEATURES IN A VEHICLE INTERIOR PANEL USING A MOVABLE MOLD MEMBER

TECHNICAL FIELD

The present disclosure relates generally to vehicle interior panels containing airbag doors and to molding techniques and tooling for making the panels.

BACKGROUND

Vehicle airbags are safety devices that deploy toward the interior of a vehicle to help protect its occupants from injury in the event of a crash. Airbags may be concealed behind or beneath an interior panel during normal vehicle operation until such an event. When the airbag deploys, it typically does so through a deployment opening formed in or around the interior panel. The deployment opening may be pre-formed in the panel, the panel may move away to reveal the opening, or the opening may be formed during airbag deployment at a pre-determined location in the panel. Where formed during deployment, a tear seam may be provided in one or more components of the panel to at least partly define the location of the opening, corresponding to an airbag door. The airbag door may open toward the vehicle interior during airbag deployment while remaining attached to the panel by a hinge, tether, or other means so that it is not projected into the vehicle cabin.

U.S. Patent Application Publication No. 2006/0079144 by Klisch et al. describes a plastic substrate for use in a vehicle interior over an airbag. The substrate is molded with a series of elongated recesses along hinge areas of the substrate. A fabric part is included at the hinge areas so that the flaps that swivel about the hinge areas during airbag deployment remain reliably attached with the plastic substrate. The fabric part has a wide mesh configuration and is located in the substrate molding tool during molding so that the molten plastic penetrates the fabric part through the wide mesh and secures the fabric part in place at the back or bottom side of the finished substrate. Tear lines are cut from the back side of the finished substrate with a laser after the molding process. The fabric part is severed and the substrate plastic is partially cut through along the tear lines, and the hinge areas are not laser cut.

SUMMARY

In accordance with one embodiment, there is provided a method of making a vehicle interior panel having a substrate with a reduced thickness portion along a boundary of an airbag door. The method includes the steps of: (a) forming a mold cavity using first and second mold sections of a substrate mold, wherein the first and second mold sections include respective first and second mold surfaces that together at least partially define the cavity, and wherein the first mold section includes a movable mold member that at least partially defines the first mold surface; (b) introducing a molten foamable plastic material into the mold cavity; (c) moving at least one of the mold sections away from the other mold section, thereby increasing the distance between the first and second mold surfaces to allow the plastic material to expand; and (d) locating the movable mold member so as to be closer to the second mold surface than surrounding portions of the first mold surface before the plastic material solidifies to thereby form the reduced thickness portion of the substrate at the mold member.

In another embodiment, the reduced thickness portion at least partially defines a hinge of the airbag door.

In another embodiment, the method further comprises the step of securing a hinge reinforcement in the mold cavity before step (b) such that a portion of the reinforcement is located between the mold surfaces at the movable mold member.

In another embodiment, the step of securing includes supporting the hinge reinforcement via openings formed through the hinge reinforcement.

In another embodiment, the reduced thickness portion at least partly defines a tear seam location.

In another embodiment, steps (c) and (d) are performed simultaneously.

In another embodiment, there is provided a structural gas injection process according to steps (a)-(d).

In another embodiment, wherein the mold member is in the same position relative to the second mold surface before step (c) and after step (d).

In another embodiment, the movable mold member comprises a slide and step (d) includes moving the slide only in a direction parallel to the relative movement of the mold sections in step (c).

In another embodiment, there is provided a vehicle interior panel for use over an airbag. The vehicle interior panel includes a decorative covering disposed over a foamed plastic substrate. The substrate includes an airbag door with an integral hinge at a reduced thickness portion of the substrate. The panel also includes a hinge reinforcement at least partly embedded in the substrate at the integral hinge.

In another embodiment, the hinge reinforcement is a scrim material.

In another embodiment, the airbag door has a boundary defined by the hinge and a plurality of openings formed through the substrate along a pre-determined deployment opening location.

In another embodiment, the vehicle interior panel is a vehicle instrument panel.

In accordance with another embodiment, there is provided an injection molding tool for molding a vehicle interior panel substrate having an integral airbag door. The injection molding tool includes a substrate mold having first and second mold sections with respective first and second opposing surfaces that together form a mold cavity when the mold is in a closed position. The first mold section includes a slide having an end that partly defines the first surface, and the slide is arranged to extend from the first mold section during a molding process to form a non-undercut feature of the airbag door.

In another embodiment, the non-undercut feature is a hinge.

Within the scope of this application it is envisaged that the various aspects, embodiments, examples, features and alternatives set out in the preceding paragraphs, in the claims and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF EMBODIMENT(S)

As will be apparent from the following disclosure, a vehicle interior panel substrate with a reduced thickness portion along a boundary of an airbag door may be formed by molding the substrate using a substrate mold that includes a movable mold member. The mold member can move during the molding process and after molten plastic material is introduced into the mold cavity to form the reduced thickness portion in the finished part. Airbag door hinges, tear seams, or other substrate features characterized by a reduced thickness may be formed in this manner. The movable mold member may also function to properly position a scrim material or other hinge reinforcement within the substrate.

Figure 1:
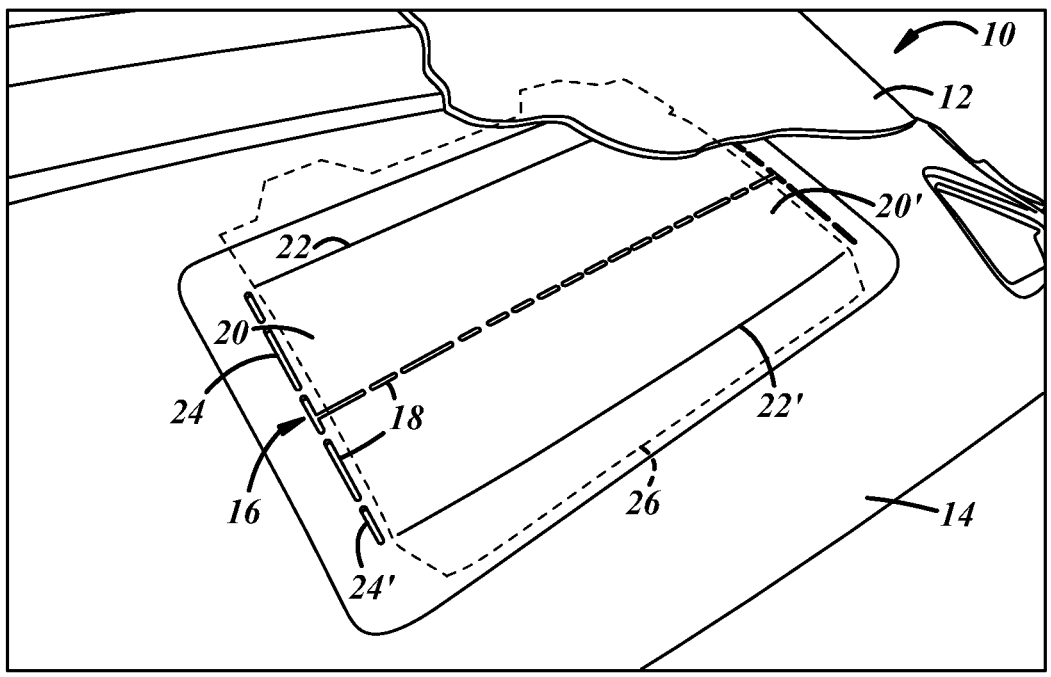
FIG. 1 is a cutaway perspective view of an instrument panel with a pair of airbag doors, according to one embodiment.

FIG. 1 illustrates one embodiment of a vehicle interior panel for use over an airbag. The illustrated panel 10 is an instrument panel, and the passenger side of the panel is shown in a cutaway view. The panel 10 includes a decorative covering 12 overlying a substrate 14. The panel 10 is configured to facilitate airbag deployment therethrough from an underlying airbag module. A predetermined tear seam location 16 is at least partly defined by a plurality of openings 18 formed through the substrate 14. In this case, the tear seam location 16 is arranged in an H-shape so that, when the airbag deploys, the substrate 14 is ruptured along location 16, and two airbag doors 20, 20' open toward the vehicle interior. Each airbag door 20, 20' pivots about a respective hinge 22, 22' during airbag deployment. In this embodiment, the airbag doors and hinges are integral parts of the substrate, meaning that they are manufactured together as a single component with the surrounding substrate. For simplicity, the hinges 22, 22' are depicted in FIG. 1 as lines that represent illustrative hinge locations. Actual hinge shapes and configurations may vary, as shown in the examples of subsequent figures, and may include concave portions, convex portions, notched or grooved portions, perforations, or other features designed to facilitate airbag door pivoting.

Each airbag door 20, 20' includes a respective boundary 24, 24' defined by a hinge 22, 22' and a portion of the tear seam location 16. For example, the boundary 24 of the upper airbag door 20 is defined by upper hinge 22 and the upper legs and cross-bar of the H-shaped tear seam location 16, while the boundary of the lower airbag door 20' is defined by the lower hinge 22' and the lower legs and cross-bar of the H-shape. The airbag deployment opening that forms through panel 10 shares some of these boundaries. Other panel configurations are possible, including panels for use with steering wheel airbag systems, side-impact airbag systems, or others. In one embodiment, the substrate does not include a tear seam location and instead includes a through-slot along the entire airbag door boundary other than the hinge portion of the boundary. In another embodiment, a groove or other type of stress-concentrator is included on the underside of the substrate opposite the covering at the tear seam location, and the substrate may or may not include openings 18. Other variations will become apparent to skilled artisans, including substrates having different airbag door shapes, the inclusion of stress concentrators in covering 16 for tear seam formation, non-integral airbag door hinges, hingeless airbag doors, etc.

Figure 2:
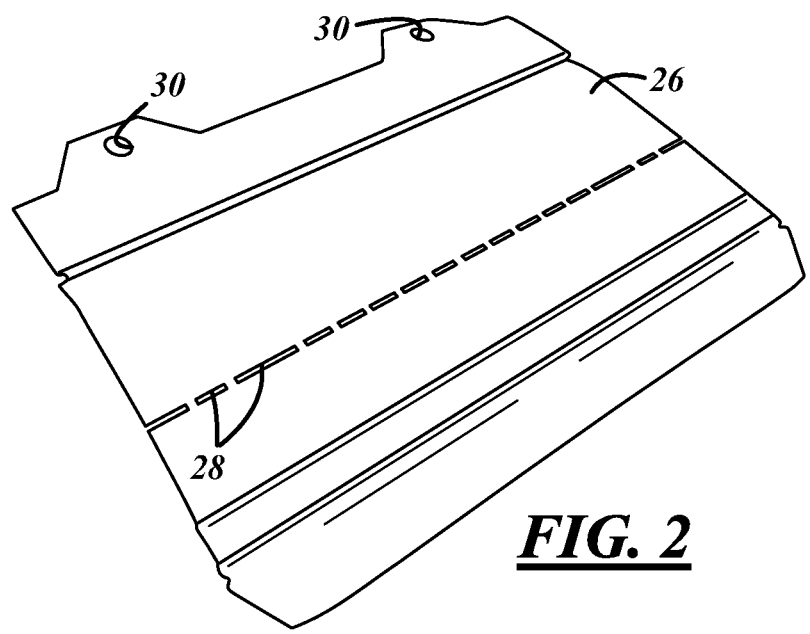
FIG. 2 is a perspective view of a hinge reinforcement from the instrument panel of FIG. 1.

Panel 10 may also include a hinge reinforcement 26, as shown in FIG. 2, in embodiments that include an airbag door hinge. The particular reinforcement 26 shown in the figure is a piece of scrim material that is molded together with the substrate 14 of FIG. 1 so that it is at least partly embedded in the plastic material of the substrate. As used here, the term "embedded" refers to material that is encapsulated on multiple sides by another material or material that is recessed into and thereby attached to another material. Scrim material may be described as a textile or fabric material, either woven or non-woven, and may include natural and/or synthetic fibers. The reinforcement may be formed from other materials as well, such as metallic or glass fibers, meshes or weaves.

The scrim material 26 is outlined in FIG. 1 as a dashed line to show its location in panel 10. In this particular example, the scrim 26 is a single piece that extends from the upper airbag door hinge 22 to the lower airbag door hinge 22' and slightly beyond each hinge. The material 26 also includes perforations 28 aligned with a portion of tear seam location 16 so that it tears therealong during airbag deployment. The illustrated scrim material 26 has a width that is less than the distance between the upright portions of the H-shape of the tear seam location 16. But the scrim material 26 could be wider and include additional perforations or other stress concentrators as needed. Openings 30 may also be included along an edge of the hinge reinforcement 26, as shown, or elsewhere. These openings may be used for supporting the reinforcement in an injection mold cavity or for other material handling purposes. The hinge reinforcement 26 is optional, and other configurations are possible. For example, where employed, the hinge reinforcement need not span nearly the entire airbag door region from one hinge to the other as shown. To function as a reinforcement, it need only be present at an airbag door hinge where the hinge is most likely to break during airbag deployment so that it helps secure the airbag door to the substrate at the opposite sides of such a break.

FIGS. 3-6 will be referenced to describe an illustrative process and equipment that can be used to form a substrate for a vehicle interior panel for use over an airbag, such as that shown in FIG. 1. More particularly, the techniques described below may be used to form a substrate with a reduced thickness portion along the boundary of an airbag door. While described in the context of forming an airbag door hinge at the reduced thickness portion and with a hinge reinforcement at the hinge, it should be understood that the following methods may be used to form reduced thickness portions anywhere along the molded substrate, such as along the tear seam locations described above. As used here, a "reduced thickness portion" refers to a portion of the substrate having a thickness less than the nominal wall thickness of the surrounding substrate by an amount that is more than normal manufacturing variation, and it does not refer to an aperture or through-hole (i.e., zero thickness).

One embodiment of the method includes the steps of: (a) forming a mold cavity between first and second mold surfaces of first and second mold sections of a substrate mold, wherein at least one of the mold sections includes a movable mold member that partially defines the respective mold surface; (b) introducing a molten plastic material into the mold cavity; (c) moving at least one of the mold sections of the substrate mold away from the other section, thereby increasing the distance between the first and second mold surfaces; and (d) locating the movable mold member so as to be closer to the second mold surface than surrounding portions of the first mold surface before the plastic material solidifies to form the reduced thickness portion of the substrate at the mold member.

Figure 3:
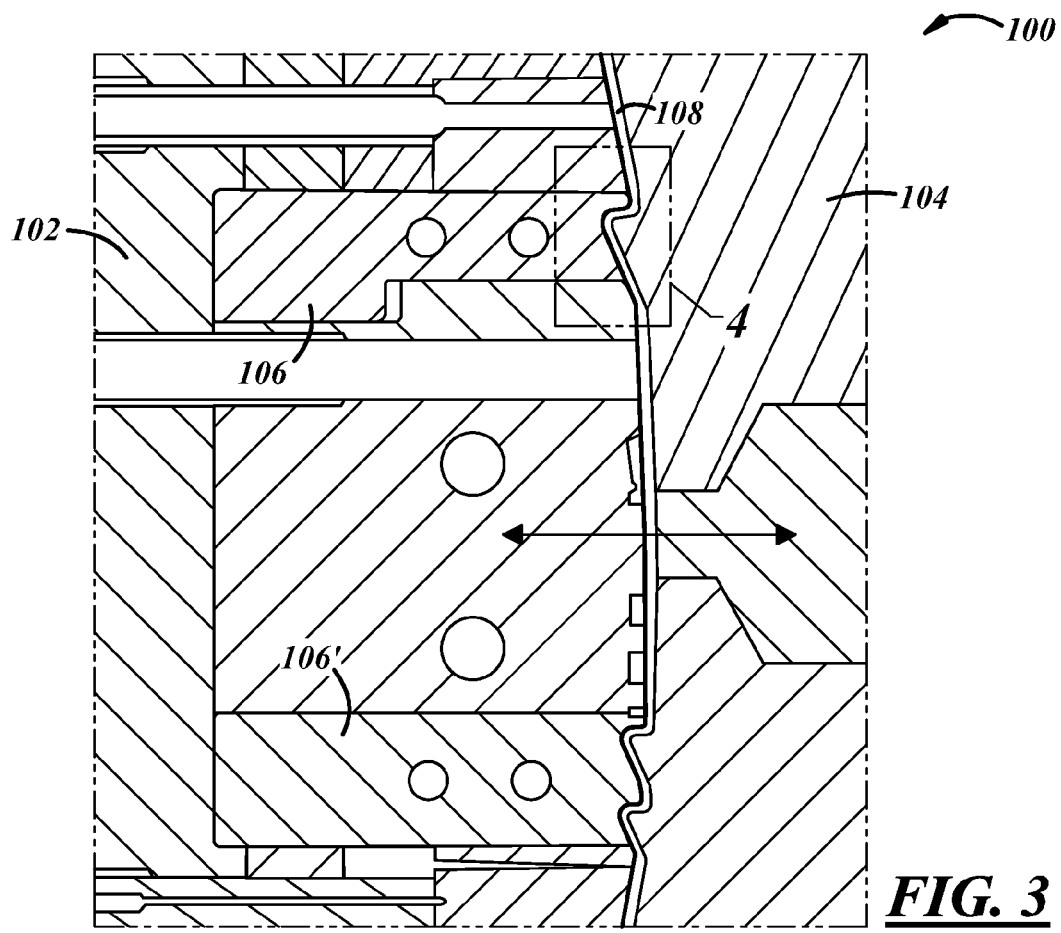
FIG. 3 is a cross-sectional view of a portion of a substrate mold in a closed position, including a mold surface partially defined by a movable mold member.

FIG. 3 is a cross-sectional view of a portion of an illustrative substrate mold 100, including first and second mold sections 102, 104. First and second mold sections 102, 104 may be mold halves, or they may be two of a larger number of mold sections that make up the substrate mold 100. The cross-section is taken through a portion of the mold that forms the airbag doors. The mold is shown in a closed position in FIG. 3, and the mold sections 102, 104 are configured to move toward and away from each other in the direction indicated by the double arrow. In the illustrated embodiment, mold section 102 is the rear half of the mold and is a movable half, and mold half 104 is the front half of the mold and is a stationary half that interfaces with a plastic injection nozzle. At least one of the mold sections, in this case the first mold section 102, includes a movable mold member 106 that is used during the molding process to form the reduced thickness portion of the substrate. Aside from being movable along with the first mold section when it moves, the movable mold member 106 is movable relative to surrounding portions of the first mold section. In this particular example, the movable mold member 106 is a slide, and an additional movable mold member 106' is included to form a reduced thickness portion at another location along the finished substrate, such as at a different airbag door hinge. A mold cavity 108 is formed between the two mold sections when the mold 100 is in the closed position as shown.

Figure 4:
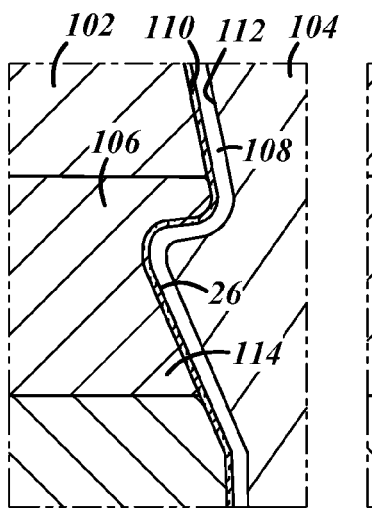
FIG. 4 is an enlarged view of a portion of FIG. 3 including the movable mold member and showing a hinge reinforcement located between the movable mold member and an opposing mold surface.
Figure 5:
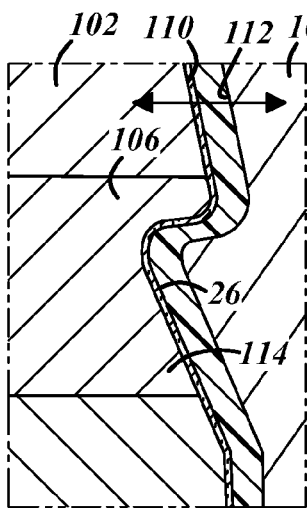
FIG. 5 is the view of FIG. 4 with the substrate mold opened slightly compared to FIG. 4.
Figure 6:
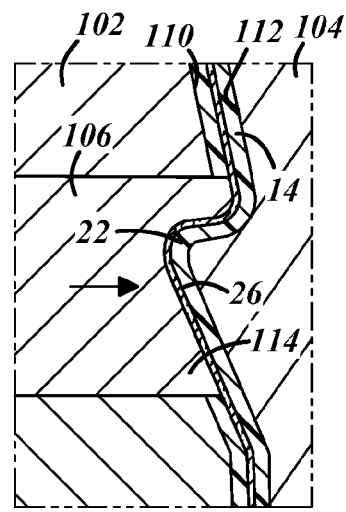
FIG. 6 is the view of FIG. 5 with the movable mold member located closer to the opposing mold surface than in FIG. 5.

FIGS. 4-6 are enlarged views of a portion of FIG. 3 showing the illustrative substrate mold during various stages of a molding process. FIG. 4 shows the mold 100 in the closed position of FIG. 3. Each of the mold sections 102, 104 includes a respective mold surface 110, 112 that defines part of the mold cavity 108. In this example, a portion of mold surface 110 is defined by an end 114 of the mold member 106. Mold member 106 is constructed and arranged to extend from its respective mold section in a direction toward the other mold section and to retract in the opposite direction. In the illustrated embodiment, the movable mold member 106 is configured to move only in a direction parallel to the direction of movement of the mold sections as they open and close. Optional hinge reinforcement 26 is shown in the mold cavity 108 in this example. Reinforcement 26 may be supported within the mold cavity 108 by various means, including openings formed through the reinforcement (e.g., openings 30 of FIG. 2), a vacuum at mold surface 110, static charge, or other means. For example, pins or dowels may be provided on the corresponding mold section to support the reinforcement 26 at the above-described openings or perforations in the reinforcement.

FIG. 5 shows the substrate mold after molten plastic material has been introduced into the mold cavity by a typical plastic injection molding step or other technique. Additionally, FIG. 5 shows the mold sections 102, 104 slightly separated from each other—i.e., no longer in the closed position. In particular, the plastic material introduced into the mold cavity in this example is a foamable plastic material, and the mold is opened a predetermined amount from the closed position to allow the plastic material to expand into the larger volume present between the mold surfaces. In this example, the reinforcement 26 is generally located in its original position within the mold cavity as shown when the plastic material is allowed to expand—i.e., it is adjacent mold surface 110, which corresponds to the underside of the finished substrate.

In one embodiment, the foamable plastic material is a plastic material that includes a foaming agent, such as a heat, pressure, or time-activated agent that forms gas bubbles within the plastic material when a threshold temperature, pressure or time is present. In another embodiment, the foamable plastic material is a plastic material that includes a gas injected and/or dissolved in the material when it is in the molten state, where the gas expands when it encounters the relatively low pressure of the mold cavity. In another example, the foamable plastic material is a mixture of materials that undergo a chemical reaction that forms gas bubbles in the resulting plastic material. Collectively, processes that use foamable plastic materials may be referred to as structural gas injection (SGI) processes. Such processes can produce a finished component with a foamed plastic core surrounded by a more dense and/or unfoamed shell or skin. For example, when the foamable plastic material is first injected into the mold cavity 108, the material in contact with the mold surfaces 110, 112 can solidify before the foamable plastic begins to expand, forming an unfoamed shell filled with molten foamable plastic. The encapsulated molten material is then allowed to expand, thus forming the finished component with the foam core and non-foam shell. One particular example of a molding process that uses a foamable plastic material, where a gas such as nitrogen or carbon dioxide is dissolved in the molten material prior to injection into the mold cavity, is a MuCell® process (available from Trexel, Inc., Wilmington, Mass.). Components produced by SGI processes may be generally lower in density than the bulk plastic would be if not foamed.

FIG. 6 shows mold member 106 in an extended position. The mold member 106 is extended from the first mold section so that it is located closer to the second mold surface than it is to surrounding portions of the first mold surface before the plastic material solidifies. The mold member 106 thus forms the reduced thickness portion, in this case airbag door hinge 22, of the finished substrate 14. The sequence of mold component movement may vary. In one embodiment, the mold member is relocated after the mold is opened a pre-determined amount from its closed position to allow the foamable plastic material to expand. In another embodiment, the mold member moves simultaneously with the controlled opening of the mold. In the example shown in the figures, this may result in the overall position of the mold member remaining unchanged with respect to the other mold section from the time the mold is in the closed position until the time the plastic material solidifies and the finished substrate is removed from the mold. In another embodiment, the mold member begins to move after the mold begins to open but before the mold is finished opening the pre-determined amount for plastic material expansion.

The amount of movement of the various mold components may also vary. In one embodiment, the nominal distance between the mold surfaces 110, 112 when the substrate mold is in the closed position is about 2.0 mm; the mold surfaces 110, 112 are further separated by about 2.0 mm to allow the foamable plastic material to expand; and the mold member 106 extends by about 2.0 mm before the plastic material solidifies. Thus, in this case, the mold member 106 is in the same location with respect to the opposite half of the mold after the mold member is extended as it was before the mold member was extended and the mold was in the closed position. The resulting substrate has a nominal thickness of about 4.0 mm, with a reduced thickness portion of about 2.0 mm. Skilled artisans will appreciate the non-limiting nature of this example and that many combinations of mold component movements are possible. In some embodiments, the movable mold member 106 may extend only a fraction of the distance that the mold opens for material expansion. In other embodiments the slide may extend an amount greater than the amount the mold opens for material expansion. Thus, the reduced thickness portion may be tailored for the particular application to affect airbag door hinge stiffness, substrate tear seam function, etc.

As illustrated in the figures, the hinge reinforcement 26, when present, may be shifted within the mold cavity by the movement of the mold member 106. The portion of the hinge reinforcement 26 that lies between the mold member 106 and the second mold surface 112, for instance, may be moved away from mold surface 110 at locations adjacent the mold member 106. Depending on the rigidity or integrity of the reinforcement, its overall size, or other factors, the entire reinforcement 26 may be shifted so that it is closer to the outer surface or topside of the finished substrate than it otherwise would be without the mold member 106 movement—in which case it would end up at the underside of the finished substrate. In other words, the mold member movement can place the hinge reinforcement in a location where it is better encapsulated by the plastic material of the substrate than it would be if left adjacent with a mold surface.

Of course other method steps may be included to form the finished substrate, such as a mold opening step, a step where the solidified plastic component is removed or ejected from the mold, post-mold finishing operation steps, etc. The mold member 106 may be retracted to its original position with respect to its corresponding mold section before or after the mold fully opens for part removal or during the time the mold is opening. Movable mold member construction and operation may be according to known structures and methods, as slides, for example, are commonly used components in plastic molding operations. However, employing a movable mold member to form a non-undercut feature in the finished part is unconventional. Though the above teachings may be also be used to form undercut features in the finished part via mold member movement in directions other than the mold opening/closing direction, the mold member in the illustrated embodiment is used to form a non-undercut feature in the finished part.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of making a vehicle interior panel having a substrate with a reduced thickness portion along a boundary of an airbag door, the method comprising the steps of:
   (a) forming a mold cavity using first and second mold sections of a substrate mold, wherein the first and second mold sections include respective first and second mold surfaces that together at least partially define the cavity, and wherein the first mold section includes a movable mold member that provides a portion of the first mold surface;
   (b) introducing a molten foamable plastic material into the mold cavity;
   (c) moving at least one of the mold sections away from the other mold section while the foamable plastic material is molten, thereby increasing the distance between the first and second mold surfaces to allow the foamable plastic material to expand by foaming; and
   (d) locating the movable mold member so that the amount of increased distance between the first and second mold surfaces in step (c) is less at the portion of the first mold surface provided by the movable mold member than at surrounding portions of the first mold surface before the foamed plastic material solidifies to thereby form the reduced thickness portion of the substrate at the mold member.

2. The method of claim 1, wherein the reduced thickness portion at least partially defines a hinge of the airbag door.

3. The method of claim 2, further comprising the step of securing a hinge reinforcement in the mold cavity before step (b) such that a portion of the reinforcement is located between the mold surfaces at the movable mold member.

4. The method of claim 3, wherein the step of securing includes supporting the hinge reinforcement via openings formed through the hinge reinforcement.

5. The method of claim 1, wherein the reduced thickness portion at least partly defines a tear seam location.

6. The method of claim 1, wherein steps (c) and (d) are performed simultaneously.

7. The method of claim 1, wherein the mold member is in the same position relative to the second mold surface before step (c) and after step (d).

8. The method of claim 1, wherein the movable mold member comprises a slide and wherein step (d) includes moving the slide only in a direction parallel to the relative movement of the mold sections in step (c).

9. A structural gas injection (SGI) process according to claim 1.

10. A vehicle interior panel for use over an airbag, comprising:
    a decorative covering disposed over a foamed plastic substrate, the substrate having an airbag door with an integral hinge at a reduced thickness portion of the substrate; and
    a hinge reinforcement at least partly embedded in the substrate at the integral hinge.

11. A vehicle interior panel as defined in claim 10, wherein the hinge reinforcement is a scrim material.

12. A vehicle interior panel as defined in claim 10, wherein the airbag door has a boundary defined by the hinge and a plurality of openings formed through the substrate along a pre-determined deployment opening location.

13. A vehicle instrument panel as defined in claim 10.

14. An injection molding tool for molding a vehicle interior panel substrate having an integral airbag door, comprising:
    a substrate mold having first and second mold sections with respective first and second opposing surfaces that together form a mold cavity when the mold is in a closed position, wherein the first mold section includes a slide having an end that partly defines the first surface, and wherein the slide is arranged to extend from the first mold section during a molding process to form a hinge of the airbag door, the molding tool further comprising features for securing a hinge reinforcement for the hinge of the airbag door in the mold cavity via openings formed through the hinge reinforcement such that a portion of the hinge reinforcement is located between the mold surfaces at the end of the slide.

15. An injection molding tool as defined in claim 14, wherein the slide is configured to reposition the hinge reinforcement within molten plastic material in the mold cavity during the molding process.

16. A vehicle interior panel as defined in claim 10, wherein the airbag door and surrounding portions of the foamed plastic substrate are made from the same foamed plastic material.

\* \* \* \* \*